US007506578B2

(12) United States Patent
Georgopoulos

(10) Patent No.: US 7,506,578 B2
(45) Date of Patent: Mar. 24, 2009

(54) FOOD SLICING DEVICE

(76) Inventor: Jimmy Georgopoulos, 810 Kennedy Drive West, Windsor, ON (CA) N9G 1T1

( * ) Notice: Subject to any disclaimer, the term of this patent is extended or adjusted under 35 U.S.C. 154(b) by 146 days.

(21) Appl. No.: 11/533,902

(22) Filed: Sep. 21, 2006

(65) Prior Publication Data

US 2007/0068358 A1 Mar. 29, 2007

Related U.S. Application Data

(60) Provisional application No. 60/720,862, filed on Sep. 27, 2005.

(51) Int. Cl.
*A47J 27/08* (2006.01)
*B26D 7/06* (2006.01)

(52) U.S. Cl. ............................ 99/337; 99/351; 99/537; 83/719; 83/167; 83/932; 83/44; 83/408; 30/114; 30/124; 30/303; 30/278; 30/299; 30/300; 30/282

(58) Field of Classification Search .................. 99/337, 99/351, 537; 83/716, 719, 167, 932, 44, 83/408; 30/114, 124, 303, 278, 299, 300, 30/282

See application file for complete search history.

(56) References Cited

U.S. PATENT DOCUMENTS

| | | | | |
|---|---|---|---|---|
| 3,112,781 A * | 12/1963 | Popeil | ..................... | 83/435.15 |
| D388,665 S * | 1/1998 | So | ............................. | D7/673 |

* cited by examiner

*Primary Examiner*—Shawntina Fuqua
(74) *Attorney, Agent, or Firm*—Gifford, Krass, Sprinkle, Anderson & Citkowski, P.C.

(57) ABSTRACT

A device for slicing the tip from an elongated food product having an elongated housing with a longitudinally extending channel open at one end and closed at its second end. The channel is dimensioned to receive the food product through the first open end of the housing. A plunger assembly is slidably mounted to the housing adjacent the second end of the housing and in the direction transverse to the channel axis. The plunger assembly includes a blade moveable between a retracted position in which the blade is retracted from the channel and an extended position in which the blade extends across the channel.

11 Claims, 3 Drawing Sheets

FOOD SLICING DEVICE

REFERENCE TO RELATED APPLICATION

This application claims priority to U.S. Provisional Patent Application Ser. No. 60/720,862, filed Sep. 27, 2005, and is incorporated herein in its entirety by reference.

BACKGROUND OF TEE INVENTION

I. Field of the Invention

The present invention relates generally to slicing devices and, more particularly, to a device for slicing a tip from an elongated food product.

II. Description of Relevant Art

In one type of food product, a flavored juice or liquid is encapsulated in an elongated plastic flexible pouch. The food product is then frozen in a refrigerator freezer.

In order to consume the food product, a tip of the plastic pouch is removed, thus exposing the frozen treat at one end of the pouch. The frozen treat may then be advanced out through the now open end of the pouch as desired by merely squeezing the opposite end of the pouch. When doing so, the pouch serves as a handle for the ice treat.

While the tip of the pouch may be easily removed by a knife or scissors by an adult, small children may accidentally injure themselves if they attempt to remove the tip with a knife or scissors.

SUMMARY OF THE PRESENT INVENTION

The present invention provides a device for slicing a tip from an elongated food product, such as a frozen juice treat, which overcomes the above-mentioned disadvantages of the previously known devices.

In brief, the device of the present invention comprises an elongated housing having a longitudinally extending channel open at a first end of the housing and closed at the second end of the housing. The channel is dimensioned so that small children are unable to extend their fingers through the channel to the second or closed end of the channel. The channel, however, is dimensioned to slidably receive the food product.

A plunger assembly is slidably mounted to the housing and is moveable in a direction transverse to the channel adjacent the second end of the housing. The plunger assembly includes a blade moveable between a retracted position, in which the blade is retracted from the channel, and an extended position in which the blade extends across the channel. One or more compression springs urge the plunger assembly and blade to its retracted position.

In order to utilize the device, a food product is inserted into the channel through its open end and so that one end of the food product abuts against the closed second end of the channel. The plunger is then depressed, thus moving the blade transversely from its retracted into its extended position which simultaneously cuts off the tip of the food product in the desired fashion. Preferably, a collection bin is contained within the housing to receive the severed tip of the food product.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
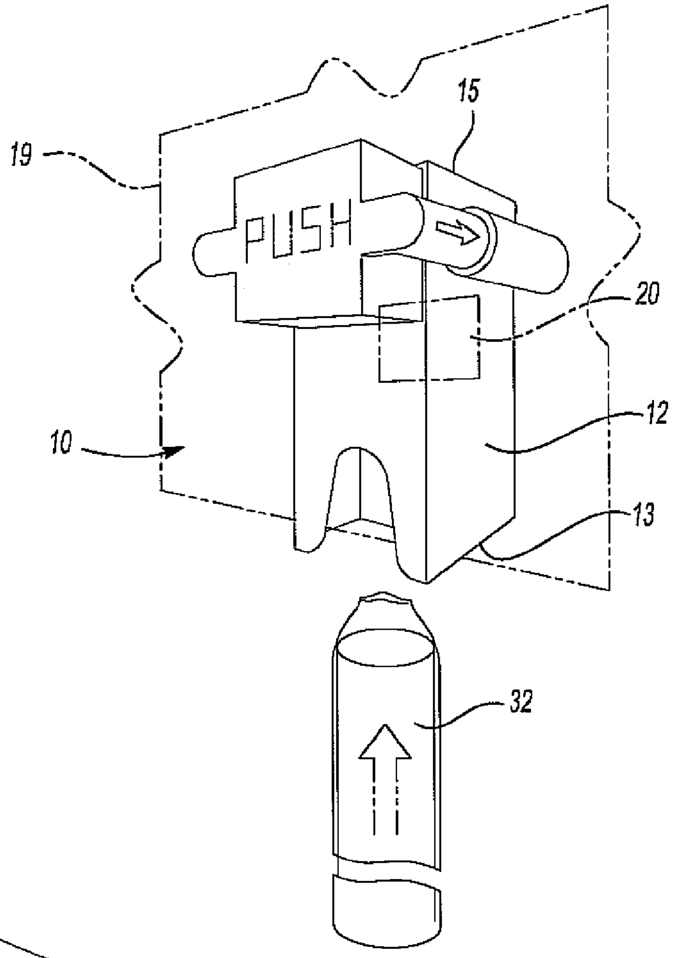
FIG. 1 is an elevational view illustrating a preferred embodiment of the present invention.

With reference first to FIGS. 1-3B, a preferred embodiment of the device 10 of the present invention is shown and comprises an elongated housing 12 having two ends 13 and 15 and which is generally rectangular in cross-sectional shape. An elongated channel 14 (FIG. 3A) is formed in the housing 12 and the channel 14 is open at a first end 16 adjacent the housing end 13 and closed at the second end 18 adjacent the housing end 15. This channel 14, furthermore, is dimensioned so that it may receive an elongated food product 32, such as a frozen ice treat, but is sufficiently small and sufficiently long to prevent a child from inserting his or her fingers through the open end 16 of the channel 14 and to the closed end of the channel 14.

The housing 14 is preferably of a plastic construction for both durability and ease of cleaning. The housing 12 is optionally mounted to a metallic surface 19 (FIG. 1), such as a refrigerator door, by a magnetic pad 20.

Figure 2:
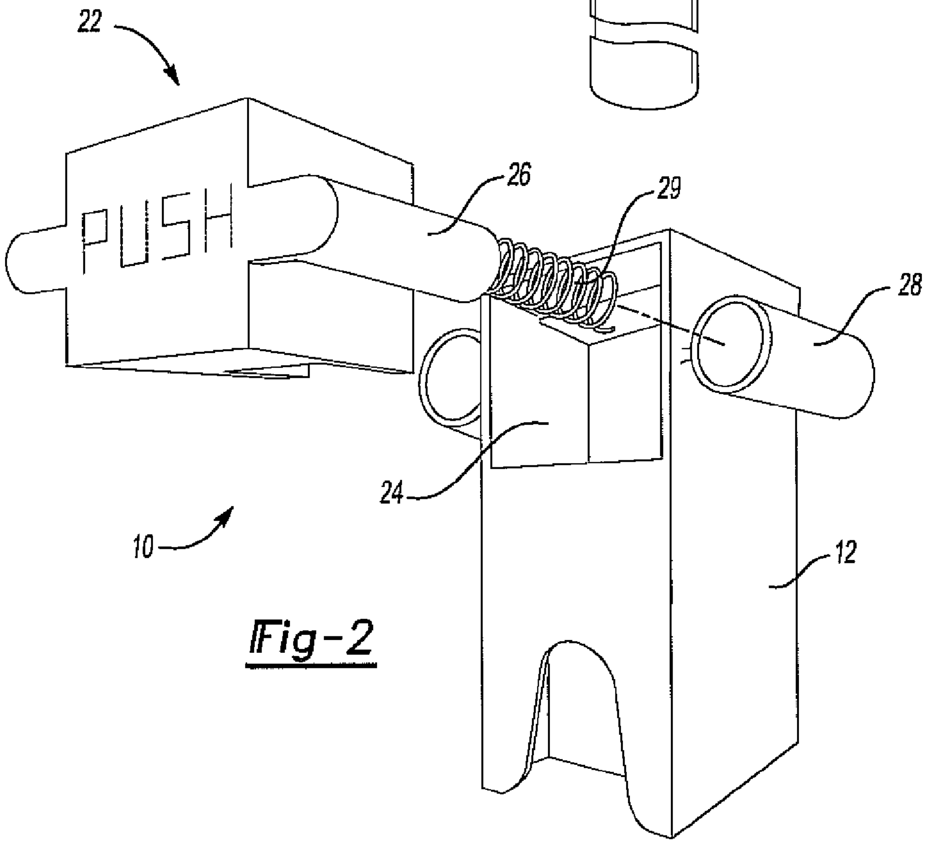
FIG. 2 is an exploded elevational view of the preferred embodiment of the invention.
Figure 4:
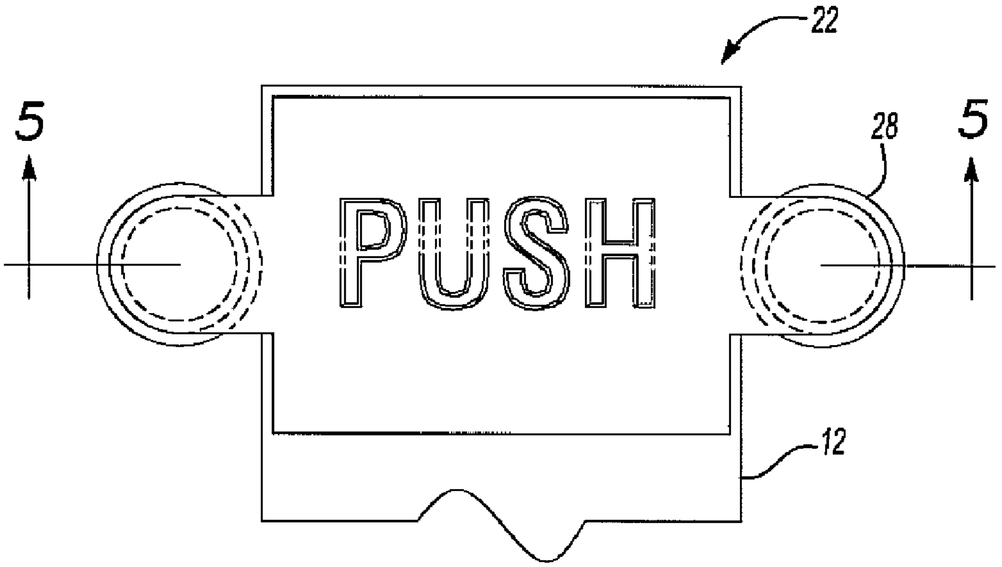
FIG. 4 is a lop fragmentary view of the preferred embodiment of the invention.
Figure 5:
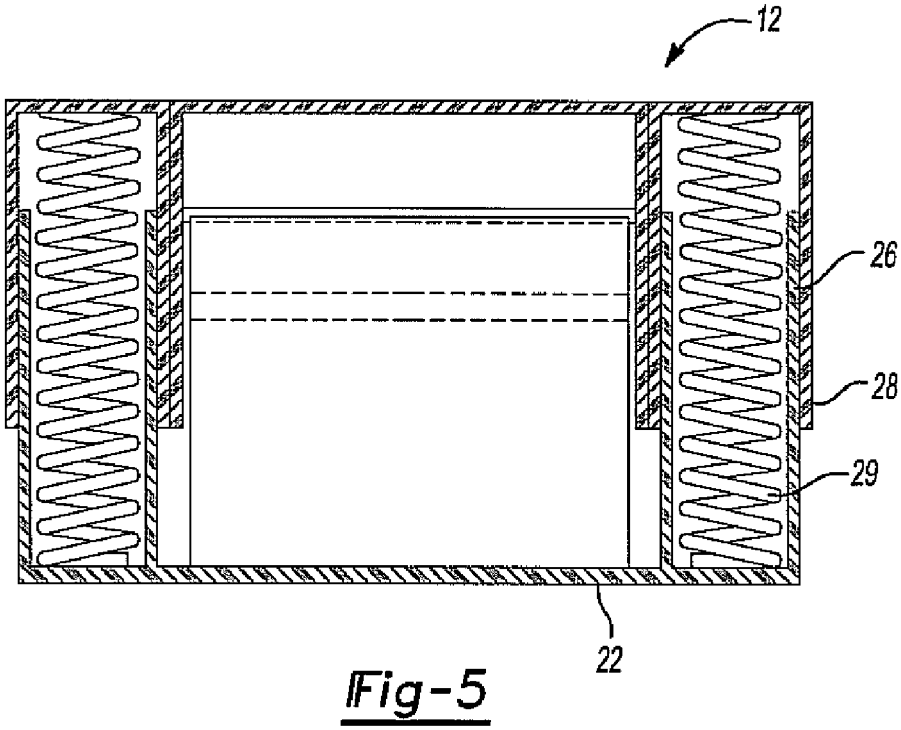
FIG. 5 is a sectional view taken substantially along line 5-5 in FIG. 4 and enlarged for clarity.

Referring now particularly to FIGS. 2, 4 and 5, a plunger assembly 22 is slidably mounted within an opening 24 adjacent the second end 18 of the channel 14. Although any conventional means may be utilized to mount the plunger assembly 22 to the housing 12, in one embodiment of the invention, the plunger assembly 22 includes a pair of spaced apart and parallel slide rods 26. Each slide rod 26 is then slidably received within a guide tube 28 attached or formed as a part of the housing 12. These guide tubes 28, furthermore, are positioned outside the channel 14 and are preferably positioned on opposite sides of the housing 12.

Figure 3A:
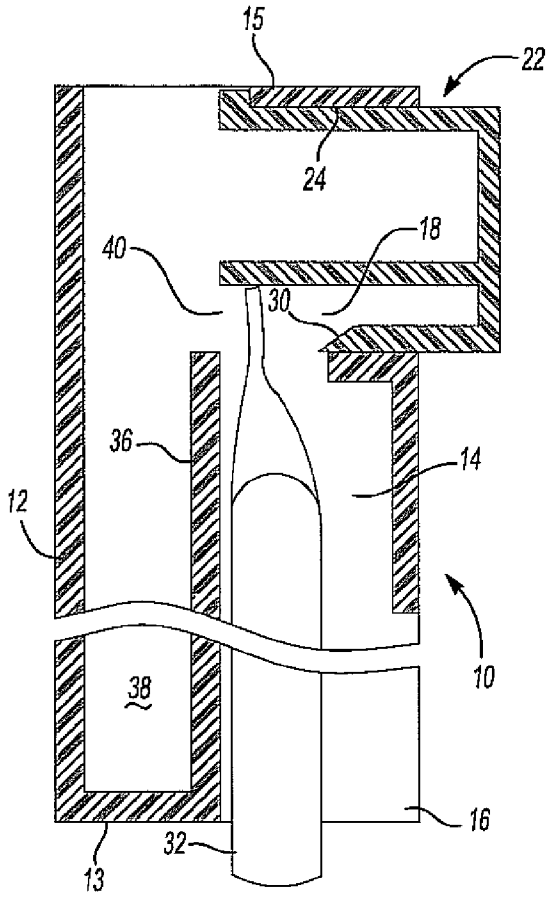
FIGS. 3A-3C are longitudinal sectional views illustrating the preferred embodiment of the present invention.
Figure 3B:
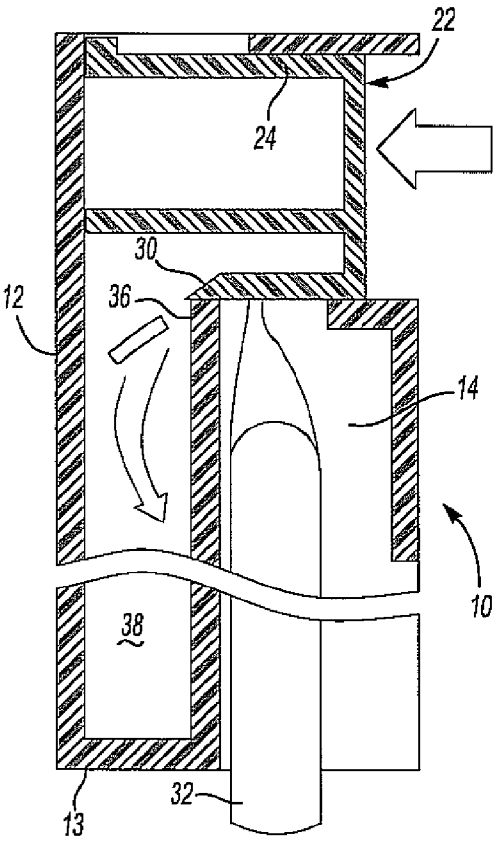

As best shown in FIGS. 3A-3B, the plunger assembly 22 is moveable in a direction transverse to the longitudinal axis of the channel 14 between a retracted position, illustrated in FIG. 3A, and an extended position, illustrated in FIG. 3B. A compression spring 29 (FIG. 5) mounted in at least one, and preferably both guide tubes 28 urges the plunger assembly 22 towards its retracted position.

Still referring to FIGS. 3A and 3B, a blade 30 is either secured to or formed as a part of the plunger assembly 22. When the plunger assembly 22 is in its retracted position, the blade 30 is retracted to one side of the channel 14 so that the food product 32, such as a frozen ice treat, may be inserted through the channel 14, past the blade 30 and positioned adjacent the end 18 of the channel 14. Upon depression of the plunger assembly 22, the blade 30 moves transversely across the channel 16 and severs the tip 34 of the food product 32 from the food product 32 as shown in FIG. 3B in the desired fashion.

Preferably, the plunger assembly 22 and blade 30 are of a one-piece plastic construction. The blade 30 may be serrated to improve its cutting performance.

Figure 3C:
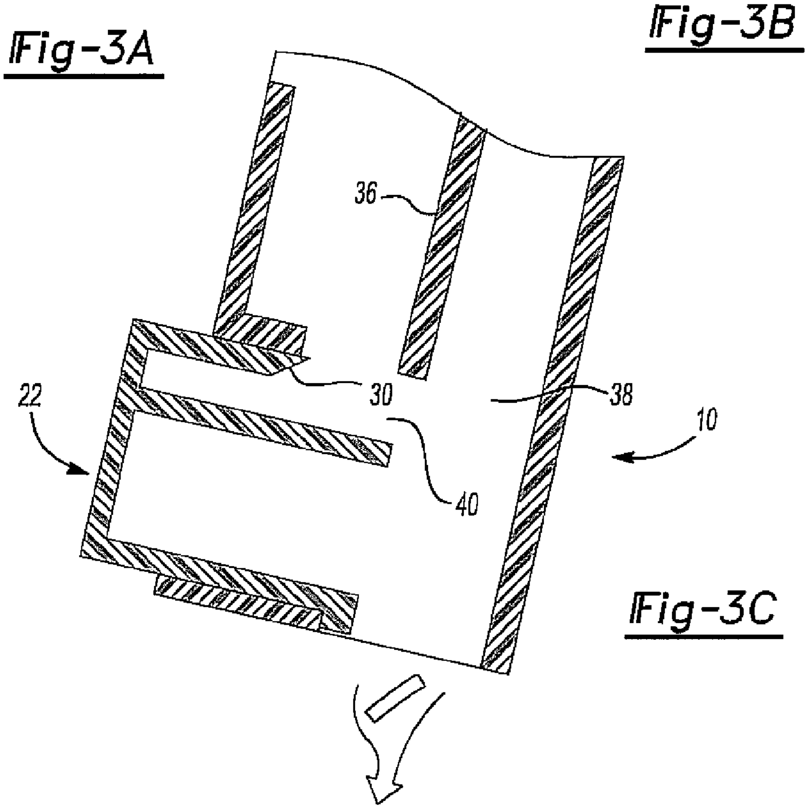

With reference now to FIGS. 3A-3C, an elongated housing wall 36 extends longitudinally through the housing 12 and forms one side of the channel 14. Simultaneously, the housing wall 36 forms a collection bin 38 within the housing 12, such that the collection bin 38 is adjacent to the food receiving channel 14.

As best shown in FIGS. 3A-3C, an opening 40 is provided through the housing wall 36 adjacent the end 18 of the housing 12. One side of the opening 40 is aligned with the blade 30. Consequently, upon depression of the plunger assembly 22 from its retracted and to its extended position, the blade 30 not only severs the tip 32 of the food product 32 from the food product 32, but also simultaneously forces the severed tip 34 through the opening 40 and into the collection bin 38. The collection bin 38 may then be emptied as required.

From the foregoing it can be seen that the present invention provides a simple, yet highly effective device for slicing a tip from an elongated food product, such as a frozen ice treat. Having described my invention, however, there are modifications thereto which will become apparent to those of skill in the art to which it pertains without deviation from the spirit of the invention as defined by the scope of the appended claims.

I claim:

1. A device for slicing a tip from an elongated food product comprising:

an elongated housing having a longitudinally extending channel open at a first end of said housing and closed at a second end of said housing, said channel dimensioned to receive the food product through said first end of said housing but sufficiently small and sufficiently long to prevent a child from inserting its fingers through the first end and to the second end of the elongated housing, and a plunger assembly slidably mounted to said housing in a direction perpendicular to a longitudinal axis of said channel adjacent said second end of said housing, said plunger assembly having a blade and movable between a retracted position in which said blade is retracted from said channel and an extended position in which said blade extends across said channel.

2. The invention as defined in claim 1 and comprising means for urging said plunger assembly towards said retracted position.

3. The invention as defined in claim 2 wherein said urging means comprises a spring.

4. The invention as defined in claim 2 wherein said urging means comprises a pair of compression springs.

5. The invention as defined in claim 4 wherein said housing comprises a pair of tubes disposed outside said channel on opposite sides of said housing adjacent said second end of said housing, said compressing springs being disposed in said tubes.

6. The invention as defined in claim 1 and comprising a collection bin formed in said housing, said collection bin being positioned adjacent said channel and said housing having an opening connecting said channel to said collection bin adjacent said second end of said housing.

7. The invention as defined in claim 6 wherein said collection bin extends parallel to said channel and is separated from said channel by a housing wall.

8. The invention as defined in claim 6 wherein said bin is open at said second end of said housing.

9. The invention as defined in claim 1 wherein said plunger assembly and said blade are of a one-piece construction.

10. The invention as defined in claim 9 wherein said plunger assembly and said blade are plastic in construction.

11. The invention as defined in claim 9 wherein said plunger assembly comprises a plunger wall which extends across said channel when said plunger assembly is in said retracted position.

* * * * *